(12) United States Patent
Rhoads

(10) Patent No.: US 11,270,103 B2
(45) Date of Patent: Mar. 8, 2022

(54) IMAGE PROCESSING METHODS AND ARRANGEMENTS

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/718,940

(22) Filed: Dec. 18, 2019

(65) Prior Publication Data

US 2020/0387699 A1 Dec. 10, 2020

Related U.S. Application Data

(63) Continuation-in-part of application No. 16/212,125, filed on Dec. 6, 2018, now abandoned.

(60) Provisional application No. 62/784,198, filed on Dec. 21, 2018.

(51) Int. Cl.
*G06K 9/00* (2006.01)
*G06T 11/60* (2006.01)
*G06T 11/20* (2006.01)
*G06N 3/08* (2006.01)

(52) U.S. Cl.
CPC ........... *G06K 9/00416* (2013.01); *G06N 3/08* (2013.01); *G06T 11/203* (2013.01); *G06T 11/60* (2013.01)

(58) Field of Classification Search
CPC .... G06K 9/00416; G06N 3/08; G06T 11/203; G06T 11/60
See application file for complete search history.

(56) References Cited

U.S. PATENT DOCUMENTS

| | | | | |
|---|---|---|---|---|
| 6,060,428 A | * | 5/2000 | Chang | B41J 2/315 503/201 |
| 2006/0071081 A1 | * | 4/2006 | Wang | G06K 7/1417 235/462.45 |
| 2007/0071278 A1 | * | 3/2007 | Cheng | G06K 9/033 382/100 |
| 2010/0303349 A1 | * | 12/2010 | Bechtel | B60R 11/04 382/165 |
| 2011/0212717 A1 | * | 9/2011 | Rhoads | G06F 16/58 455/420 |
| 2011/0276663 A1 | * | 11/2011 | Rhoads | G07D 7/0034 709/219 |
| 2014/0210780 A1 | * | 7/2014 | Lee | G06F 3/0445 345/174 |
| 2014/0366052 A1 | * | 12/2014 | Ives | H04N 21/23418 725/19 |
| 2015/0262347 A1 | * | 9/2015 | Duerksen | G07D 7/20 382/182 |
| 2019/0289330 A1 | * | 9/2019 | Alakuijala | H04N 19/85 |

\* cited by examiner

*Primary Examiner* — Qun Shen
(74) *Attorney, Agent, or Firm* — Digimarc Corporation

(57) ABSTRACT

In accordance with one aspect of the technology, handwritten works (e.g., notes) produced using computer devices are encoded with digital information that is persistently bound with such works, even after conversion into analog form. In accordance with another aspect of the technology, strokes of artwork or handwriting, or glyphs of computer-rendered text, are encoded in a form that permits any alteration of such work to be detected. A variety of other features and arrangements are also detailed.

15 Claims, 5 Drawing Sheets

| 11 | 01 | 00 | 11 |
|----|----|----|----|
| 10 | 01 | 01 | 11 |
| 00 | 11 | 10 | 10 |
| 01 | 11 | 01 | 01 |
| 11 | 00 | 10 | 11 |

| 00 | 10 | 11 | 00 |
|----|----|----|----|
| 01 | 01 | 01 | 11 |
| 11 | 11 | 01 | 01 |
| 10 | 11 | 01 | 10 |
| 00 | 11 | 01 | 00 |

PDF CONTAINER

CLASSIC SHEET

SECURE SHEET

IMAGE PROCESSING METHODS AND ARRANGEMENTS

RELATED APPLICATION DATA

This application claims benefit of U.S. Provisional Application No. 62/784,198, filed Dec. 21, 2018. This application also is a continuation-in-part of application Ser. No. 16/212,125, filed Dec. 6, 2018 (now published as US20190213705). The disclosures of these prior applications are incorporated herein by reference.

INTRODUCTION

Handwriting and manually-created art continue to play important roles in human communication. Computer tablets have been adapted to permit handwriting input, and are also commonly used for art creation. But when graphics from such manual activities on computer devices are printed, or otherwise leave their original digital form, any metadata associated with the work is lost.

In accordance with one aspect of the technology, handwritten works produced using computer devices are encoded with digital information that is persistently bound with such works, even after conversion into analog form.

In accordance with another aspect of the technology, strokes of artwork or handwriting, or even glyphs of computer-rendered text, are encoded in a form that permits any alteration of such work to be detected.

The foregoing and other features and advantages of the present technology will be more readily apparent from the following detailed description, which proceeds with reference to the accompanying drawings.

DETAILED DESCRIPTION

Figure 1:
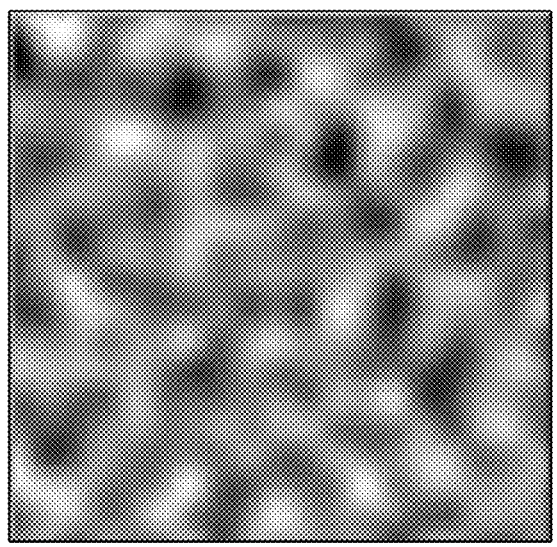
FIGS. 1 and 2 show excerpts of signal-carrying patterns.

One aspect of the present technology concerns code signaling via manually-created art and other content.

Styluses are in widespread use for manually-creating content, both by graphics professionals (e.g., producing art) and by office workers (e.g., taking handwritten notes). Styluses are commonly used with tablets. Tablets may be categorized in two varieties. One variety is tablets in which a stylus is applied to a touch-sensitive display screen of a computer (e.g., the Apple iPad device). The other variety is tablets in which a stylus is applied on a touch-sensitive pad that serves as a peripheral to a separate computer (e.g., the Wacom Intuos device). The latter device is sometimes termed a graphics tablet.

As is familiar to artisans, tablets repeatedly sense the X- and Y-locations of the tip of the stylus, allowing the path of the stylus to be tracked. A marking—such as a pen or pencil stroke—can thereby be formed on a display screen, and corresponding artwork data can be stored in a memory.

Various location-sensing technologies are used. So-called "passive" systems (as typified by many Wacom devices) employ electromagnetic induction technology, where horizontal and vertical wires in the tablet operate as both transmitting and receiving coils. The tablet generates an electromagnetic signal, which is received by an inductor-capacitor (LC) circuit in the stylus. The wires in the tablet then change to a receiving mode and read the signal generated by the stylus. Modern arrangements also provide pressure sensitivity and one or more buttons, with the electronics for this information present in the stylus. On older tablets, changing the pressure on the stylus nib or pressing a button changed the properties of the LC circuit, affecting the signal generated by the stylus, while modern ones often encode into the signal as a digital data stream. By using electromagnetic signals, the tablet is able to sense the stylus position without the stylus having to even touch the surface, and powering the stylus with this signal means that devices used with the tablet never need batteries.

Active tablets differ in that the stylus contains self-powered electronics that generate and transmit a signal to the tablet. These styluses rely on an internal battery rather than the tablet for their power, resulting in a more complex stylus. However, eliminating the need to power the stylus from the tablet means that the tablet can listen for stylus signals constantly, as it does not have to alternate between transmit and receive modes. This can result in less jitter.

Many tablets now employ capacitive sensing, in which electric coupling between electrodes within the tablet varies in accordance with the presence of an object—other than air—adjacent the electrodes. There are two types of capacitive sensing system: mutual capacitance, where an object (finger, stylus) alters the mutual coupling between row and column electrodes (which are scanned sequentially); and self- or absolute capacitance, where the object (such as a finger) loads the sensor or increases the parasitic capacitance to ground. Most smartphone touch screens are based on capacitive sensing.

Then there are some styluses that don't require a tablet—those that rely on optical sensing. These devices are equipped with small cameras that image features on a substrate, by which movement of the stylus can be tracked.

Motion deduced from the camera data is sent to an associated computer device. The Anoto pen is an example of such a stylus.

The pressure with which the stylus is urged against the virtual writing surface can be sensed by various means, including sensors in the stylus itself (e.g., a piezo-electric strain gauge), and sensors in the tablet surface (e.g., sensing deflection by a change in capacitance). Examples are taught in patent documents 20090256817, 20120306766, 20130229350, 20140253522, and references cited therein.

A variety of other stylus/tablet arrangements are known but are not belabored here; all can be used with the technology detailed herein.

In use, a computer device monitors movements of the stylus, and writes corresponding information to a memory. This information details the locations traversed by the status, and may also include information about the pressure applied by the stylus. The location information may be a listing of every {X,Y} point traversed by the stylus, or only certain points may be stored—with the computer filling-in the intervening locations by known vector graphics techniques. Each stroke may be stored as a distinct data object, permitting the creator to "un-do" different strokes, or to format different strokes differently.

Each stroke is commonly associated with a tool, such as a virtual pen, pencil or brush. (The term "brush" is used in this description to refer to all such tools.) The tool defines characteristics by which the stroke is rendered for display, e.g., whether as a shape that is filled with a fully saturated color (e.g., as is commonly done with pen tools), or as a shape that is filled with a pattern that varies in luminance, and sometimes chrominance, across its extent (e.g., as is commonly done with pencil tools). When pressure is sensed, the pressure data may be used to vary the width of the stroke, or to increase the darkness or saturation or opacity of the pattern laid down by the stroke.

Users commonly think of their stylus strokes as applying digital "ink" to a virtual "canvas." Different "layers" may be formed—one on top of the other—by instructions that the user issues through a graphical user interface. Alternatively, different layers may be formed automatically—each time the user begins a new stroke. The ink patterns in the different layers may be rendered in an opaque fashion—occluding patterns in any lower layer, or may be only partially opaque (transparent)—allowing a lower layer to partially show-through. (As noted, opacity may be varied based on stylus pressure. Additionally, going over a stroke a second time with the same tool may serve to increase its opacity.)

In practical implementation, all of the input information is written to a common memory, with different elements tagged with different attributes. The present description usually adopts the user's view—speaking of canvas and layers, rather than the well-known memory constructs by which computer graphic data are stored. The mapping from "canvas" to "memory" is straightforward to the artisan. Transparency is commonly implemented by a dedicated "alpha" channel in the image representation. (For example, the image representation may comprise red, green, blue and alpha channels.)

Figure 2:
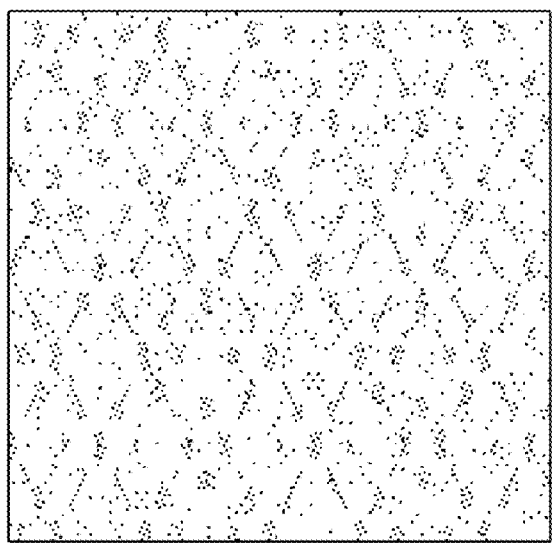

FIGS. 1 and 2 are tiles of illustrative signal-bearing patterns (digital watermark patterns in these examples). These are greatly magnified for purposes of reproduction; the actual patterns have a much finer scale. Also, the actual patterns are continuous—the right edge seamlessly continues the pattern on the left edge, and similarly with the top and bottom edges. As described earlier, FIG. 1 may be regarded as a continuous pattern—comprised of element values (e.g., pixels) that vary through a range of values. FIG. 2 may be regarded as a sparse pattern FIG. 1 also greatly exaggerates the contrast of the pattern for purposes of illustration. The depicted tile has a mean value (amplitude) of 128, on a 0-255 scale, and some pixels have values of near 0 and others have values near 255. More typically the variance, or standard deviation, from the mean is much smaller, such as 5 or 15 digital numbers. Such patterns commonly have an apparently uniform tonal value, with a mottling, or salt-and-pepper noise, effect that may be discerned only on close human inspection.

A first method for human-authoring of signal-bearing content is to tile blocks of a desired signal-carrying pattern, edge-to-edge, in a layer, to create a pattern coextensive with the size of the user's canvas. A second layer, e.g., of solid, opaque, white, is then applied on top of the first. This second layer is all that is visible to the user, and serves as the canvas layer on which the user works. The tool employed by the user to author signal-bearing content does not apply pattern (e.g., virtual ink, or pixels) to this second layer, but rather erases from it—revealing portions of the patterned first layer below.

Technically, the erasing in this arrangement is implemented as changing the transparency of the second layer—allowing excerpts of the underlying first layer to become visible. The tool used can be a pen, pencil, brush, or the like. The tool may change the transparency of every pixel within its stroke boundary to 100% (or, put another way, may change the opacity of every pixel to 0%). Alternatively, the brush may change the transparency differently at different places within the area of the stroke, e.g., across the profile of the brush.

Figure 3:
FIG. 3 shows how glyphs that are hand-written on a tablet can employ a signal-carrying pattern.
Figure 4:
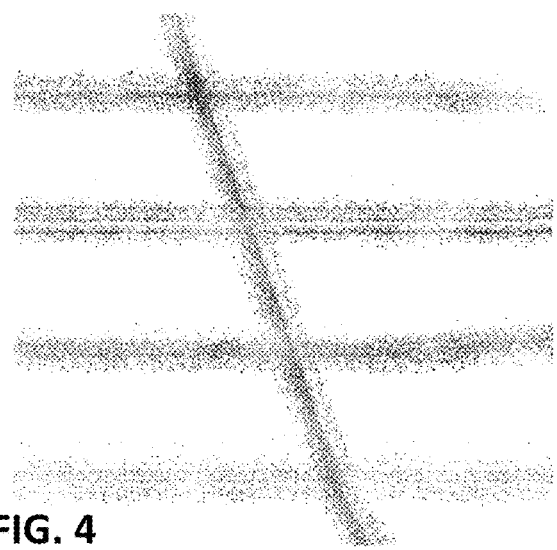
FIG. 4 shows how strokes on a tablet can have directional texture associated with a brush, and/or its direction of use, while also employing a signal-carrying pattern.

FIG. 3 shows the former case—the brush changes the transparency of every pixel in its path from 0% to 100%, resulting in a pattern with sharp edges. FIG. 4 shows the latter case—different regions in the brush change the transparency differently—a little in some places, a lot in others. (In so-doing, the brush changes the mean value, and the variance, of the underlying pattern as rendered on the canvas.) Such a brush adds texture.

The texture added by a brush commonly has an orientation that is dependent on the direction the brush is used—just as filaments of a physical brush leave fine lines of texture in their wake. The signal-carrying pattern revealed by the brush has a texture, too. But the signal-carrying pattern texture always has a fixed orientation—both in rotation, scale and position. It does not matter in which direction the brush is applied; the spatial pose of the revealed pattern is constant.

In some embodiments, repeated brush strokes across a region successively increase the transparency of the top layer, revealing the underlying signal-carrying pattern to successively darker degrees. A first brush stroke may reveal the pattern by applying a 20% transparency to the covering second layer. Such a pattern has a light tone; a high mean value (and a small variance). A second brush over the same area stroke may increase the transparency to 40%, darkening the tone a bit, and increasing the variance. And then 60%, and 80%, until finally the covering layer is 100% transparent, revealing the underlying pattern with its original mean and variance. With each increase in transparency, the contrast of the rendered, revealed signal pattern is increased.

Figure 5:
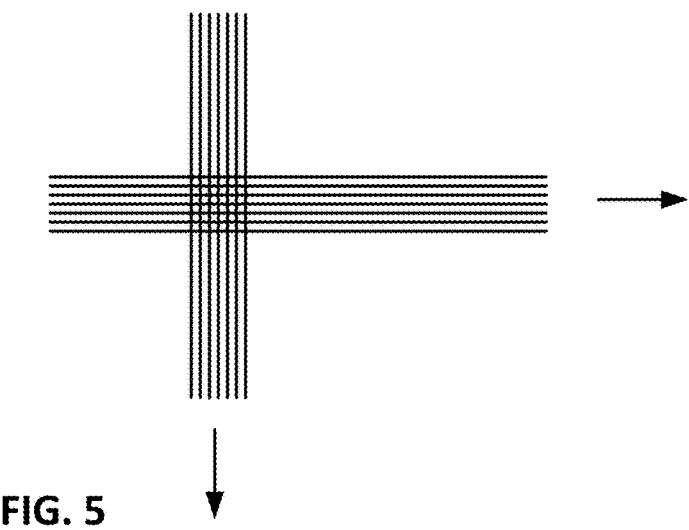
FIG. 5 conceptually-illustrates how two overlapping brush strokes may effect a darkening of a common region, while maintaining two directional textures.
Figure 6:
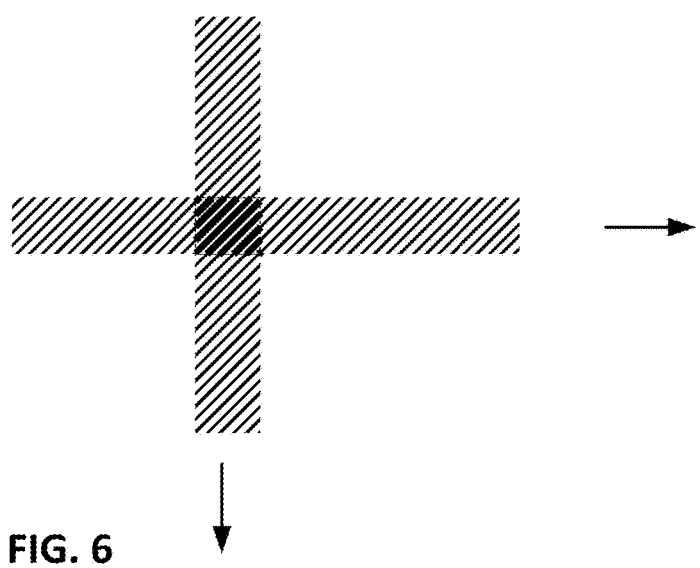
FIG. 6 conceptually-illustrates how two overlapping brush strokes that apply a signal-carrying pattern may effect a darkening of a common region by changing a mean value of the pattern.

This is schematically illustrated by FIGS. 5 and 6. FIG. 5 conceptually illustrates how a prior art brush applies marks to a canvas—with a texture whose orientation is dependent on the directions of the strokes (shown by arrows). Where strokes overlap, a darker marking is rendered—since more virtual ink is applied in the region of overlap. FIG. 6 is a counterpart illustration for this aspect embodiment of the present technology. The orientation of the pattern does not depend on the direction of the brush stroke. Where strokes cross, the underlying pattern is rendered more darkly, with greater contrast.

The degree of transparency of a stroke can also be varied by changing the pressure applied to the stylus. At one pressure, a stroke may increase the transparency of the covering layer by 70% (e.g., from 0% to 70%). At a second, higher, pressure, a stroke may change the transparency of the covering layer by 100% (from 0% to 100%). Many intermediate values are also possible.

Figure 7A:
FIG. 7A shows that the mean value of patterning in a rendering of handwritten glyphs can depend on stylus-applied pressure.

Such arrangement is shown in FIG. 7A. The digit '5' is written at one pressure, and the digit '7' is written with a lighter pressure. The latter stroke is rendered with less transparency (pixels within the boundaries of the '5' stroke are rendered at 100% transparency, whereas the pixels within the '7' are rendered at a lesser transparency). The mean value of the pixels within the boundary of the '5' in FIG. 5 matches the mean value of the corresponding pixels in the underlying signal-carrying pattern. In contrast, the mean value of the pixels within the boundary of the '7' have a mean value higher than that of the corresponding pixels in the underlying pattern.

Figure 7B:
FIG. 7B is like FIG. 7A but with the patterning less-exaggerated in contrast.
Figure 7C:
FIG. 7C is like FIG. 7B, but is presented at a more typical scale.

(As noted, the contrast is greatly exaggerated in most of the images; FIG. 7B shows handwritten digits with contrast of a more typical value. FIG. 7C shows the handwritten digits with a more typical contrast and size.)

While the just-described arrangement employs an underlying, signal-conveying layer that is coextensive in size with the top layer, this is not necessary. Since the pattern is repeated in a tiled arrangement, the system memory may store just a single tile's worth of pattern data. Such a tile may have dimensions of 128×128 (e.g., pixels), while the canvas may have dimensions of 1280×1024. If the user picks a signaling brush (i.e., one that reveals the signal-carrying pattern), and draws a brush stroke starting from canvas X-, Y-coordinates {10,100}, and continuing to coordinates {10, 200} (and encompassing a surrounding region dependent on a profile of the brush), the system effects a modulo operation to provide pattern when the original tile "runs-out" of data (i.e., after coordinate {10,128}. That is, for the start of the stroke, the erasing operation reveals the signal pattern between coordinates {10,100} and {10,128}. Once it reaches value 128 (in either dimension), it performs a mod-128 operation and continues. Thus, the pattern that is revealed at coordinates {10,130} is read from tile coordinates {10,2}, and so forth.

While the foregoing description was based on erasing a blank layer to reveal a signal-carrying layer beneath, more typically a different approach is used. That is, a brush applies digital ink to an artwork layer in a pattern conveying the plural-bit payload. The pattern is two-dimensional and stationary, with an anchor point (e.g., at the upper left corner of the canvas) to which the pattern is spatially related (i.e., establishing what part of the pattern is to be laid-down at what part of the canvas).

A simple implementation can be achieved by using the capability to pattern-draw that is built into certain graphics tools, like Photoshop. In that software, a tile of signal-conveying pattern can be imported as an image, selected, and then defined as a Photoshop pattern (by Edit/Define Pattern). The user then paints with this pattern by selecting the Pattern Stamp tool, selecting the just-defined pattern from the pattern menu, and choosing a brush from the Brush Presets panel. By selecting the "Aligned" option, the pattern is aligned from one paint stroke to the next. (If Aligned is deselected, the pattern is centered on the stylus location each time a new stroke is begun.)

Instead of modulating transparency, software may be written so that stylus pressure (or stroke over-writing) modulates the mean value of the payload-carrying pattern: darker pattern (i.e., lower mean values) is deposited with more pressure; lighter pattern (higher mean values) is deposited with less pressure. The signal-carrying strength of the pattern (i.e., its variance) can be set as a menu parameter of the brush with which the pattern is applied.

The signal-carrying pattern typically includes both plural-bit payload information, and also a synchronization signal. The payload information may include data identifying the user, the date, the GPS-indicated time or location, a product GTIN, or other metadata specified by the user. This information may literally be encoded in the payload, or the payload may be a generally-unique ID that serves as a pointer into a local or remote database where corresponding metadata is stored. As is familiar from the prior art (including U.S. Pat. No. 6,590,996), the payload is error-correction encoded, randomized, and expressed as +/−"chips" that serve to increase or decrease parameters (e.g., luminance or chrominance) of respective pixels in a reference signal tile. The synchronization signal can comprise an ensemble of multiple spatial domain sinusoids of different frequencies (and, optionally, of different phases and amplitudes), which can be specified succinctly by parameters in a frequency domain representation. A Fourier transform can then be applied to produce a corresponding spatial domain representation of any dimension. The resulting sinusoids are coextensive with the reference signal tile, and are added to it, further adjusting pixel values.

In some embodiments, the software enables the brushes to be configured to apply signal-carrying patterns having different means and variances, as best suits the user's requirements. To introduce highlights into an artwork, a pattern having a light tone, such as a mean digital value of 200, can be employed. To introduce shadows, a pattern having a dark tone, such as a mean value of 50, can be employed. The variance, too, may be user selectable—indicating the degree of visible mottling desired by the content creator. As is familiar from graphics programs such as Photoshop, the user may invoke software to present a user-interface by which such specific parameters of the brush can be specified. The software program responds by generating a reference signal tile (or a needed excerpt) having desired mean and variance values.

One particular approach to enabling such variation in mean amplitude and variance is to store reference data for the tile as an array of real-valued numbers, ranging from −1 to +1. (Such an array can be produced by summing a +/− chip, and a synchronization signal value, for each element in a tile, and then scaling the resultant array to yield the −1 to +1 data array.) This reference data can then be multiplied by a user-selected variance (e.g., 15, yielding values between −15 and +15), and then summed with a user-specified mean value (e.g., 200, yielding values between 185 and 215) to generate a reference tile with the desired variance and mean.

The variance or the mean, or both, may be modulated in accordance with the stylus pressure. If the pressure increases, the darkness can be increased by reducing the mean value. (E.g., a nominal pressure may correspond to a mean value of 128; greater pressures may cause this value to reduce—ultimately to 30; lesser pressures may cause this value to increase—ultimately to 220.)

The spatial scale of the signaling pattern can also be varied, e.g., by specifying a reference signal tile that conveys its information at a specific spatial scale. For example, a tile that is usually 128×128 pixels may instead be specified as 256×256 pixels, causing the spatial scale to double (which halves the spatial frequency of the signaling components). Again, the user can set such parameter to whatever value gives a desired visual effect. (The reference data can be generated accordingly, e.g., by spreading the payload chips over a 256×256 data array, and summing with a spatial synchronization signal that has been transformed from its frequency domain representation to a spatial signal having a 256×256 scale.) Typically, a smaller scale is used, so that the payload can be recovered from a smaller excerpt of pattern-based art.

Some drawing applications associate a (virtual) physical texture with the canvas. This causes certain tools to behave differently: the virtual ink deposited depends not just on the tool configuration, but also on the surface microtopology where the ink is applied. At points where the surface microtopology has a local maximum, more ink is deposited (being analogous to more pressure being applied—by the surface more firmly engaging the tool at such locations). At valleys between such maxima, less ink is deposited.

So, too, with embodiments of the present technology. A texture descriptor associated with the canvas serves to similarly modulate the contrast with which the signal-carrying pattern is rendered on the canvas. The pattern is rendered more darkly at locations where the texture has higher local peaks. As the user applies more pressure to the stylus, more of the valleys between the peaks are filled-in with pattern (or are filled-in with darker pattern).

Figure 8A:
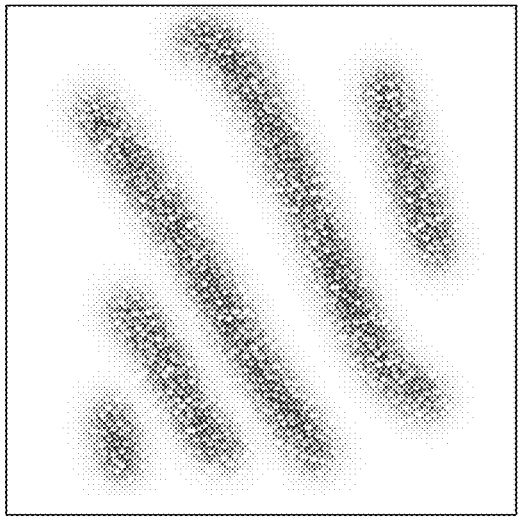
FIGS. 8A and 8B show how handwritten glyphs entered by a stylus can be patterned with different patterns, including a neural network-derived signal-carrying pattern.
Figure 8B:
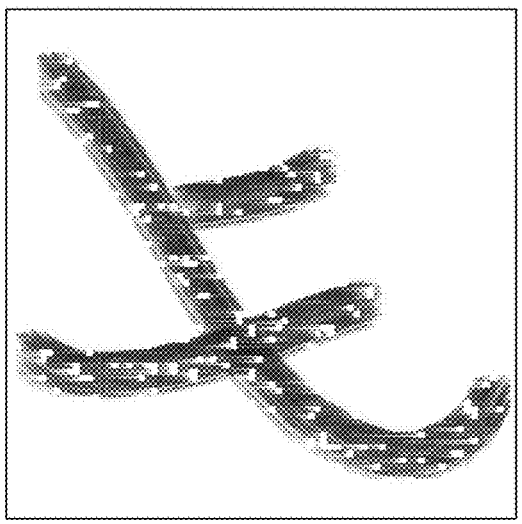

Although the depicted examples use a continuous-tone monochrome pattern consisting of just signal (e.g., the tile of FIG. 1), in many applications other signal-carrying patterns are used. Exemplary are the signal-carrying patterns produced using the techniques, including neural network techniques, described in published patent applications US20190213705 and US20190378235, and in pending application 62/946,732, filed Dec. 11, 2019. FIGS. 8A and 8B show stylus strokes with exemplary neural network-produced patterning. Patterns based on natural imagery (e.g., the rice grains and water droplets of FIGS. 15A and 15B in US20190213705) and synthetic imagery (e.g., geometrical patterns of the sort used in FIGS. 8-10 of 20190213705) can both be used.

Figure 9:
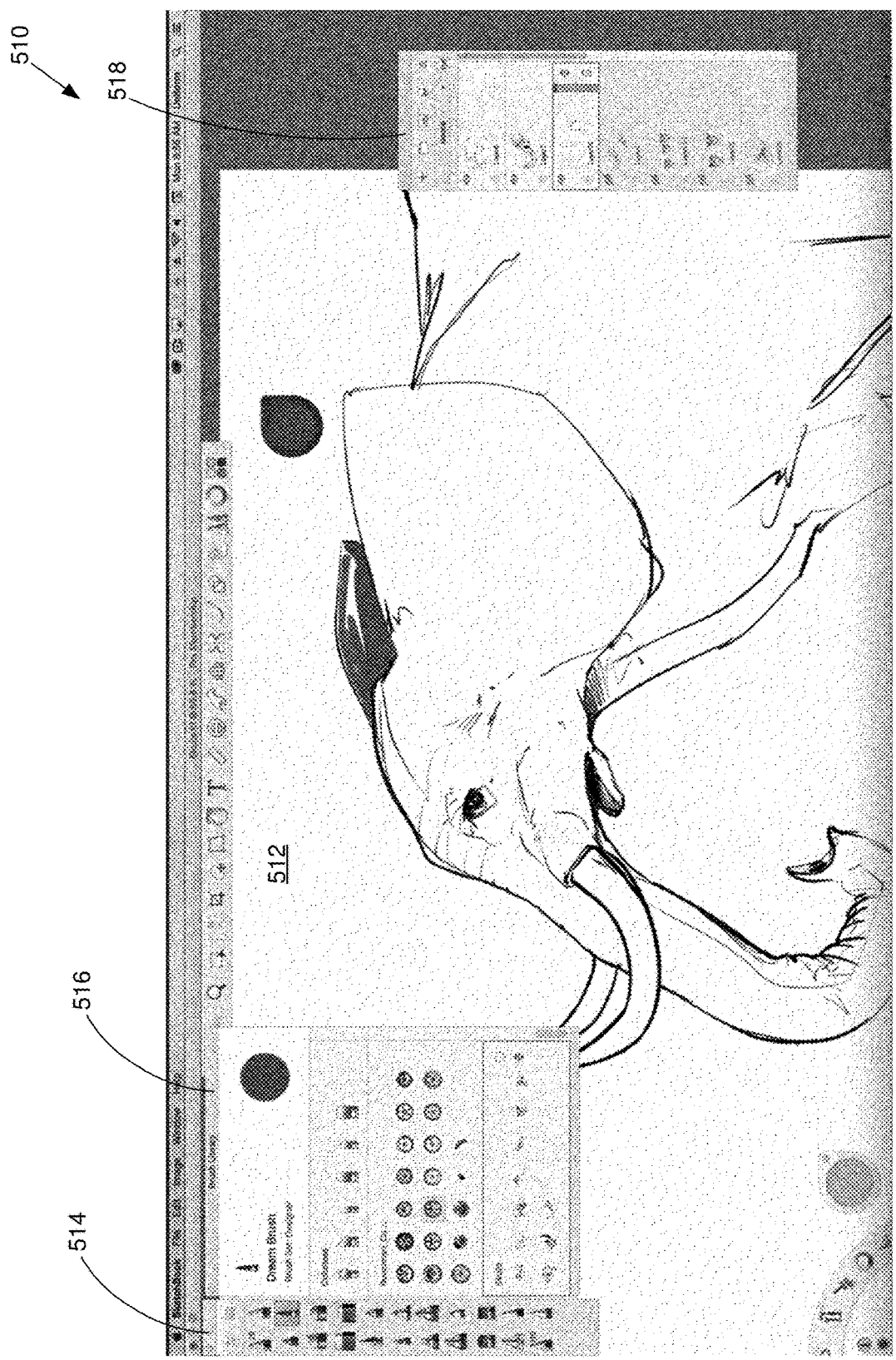
FIG. 9 shows the user interface of a prior art tablet drawing program.

FIG. 9 shows a prior art user interface 510 of a tablet drawing app (Sketchbook by Autodesk, Inc.). In addition to a drawing area 512, the interface includes a tools menu 514, a properties panel 516, and a layers guide 518. The user can pick up a desired tool (e.g., brush, pencil, etc.) by tapping the stylus on a corresponding icon in the tools menu 514. The properties panel 516 can be opened to customize the parameters of the tool. The layers guide 518 enables the user to select different layers for editing.

In some embodiments of the present technology, one or more tools are dedicated to the purpose of drawing with a signal-carrying pattern, as detailed above. These tools may be so denoted by including graphical indicia within the icon, such as the binary bits "101," thereby clueing-in the user to their data encoding functionality. When a user selects such a tool from the tools menu 514, selections can be made from the properties panel 516 to define signal-customization parameters, such as the pattern to be used (e.g., the pattern 2), color, mean value, variance, and scale—in addition to the parameters usually associated with prior art tools.

In other embodiments, no tools are dedicated to applying signal-carrying patterns. Instead, all tools have this capability. This capability can be invoked, for a particular tool, making a corresponding selection in that tool's properties panel. Again, signal-customization options such as mean value, variance, and scale can be presented.

In still other embodiments, all tools apply signal-carrying patterns. The properties panel for each tool include options by which such signal can be customized.

To review, certain embodiments according to these aspects of the technology concern a method of generating user-authored graphical content. Such method makes use of a hardware system including a processor and a memory, and includes: receiving authoring instructions from a user, where the instructions taking the form of plural strokes applied to a virtual canvas by a virtual tool; and responsive to said instructions, rendering a first signal-carrying pattern on the canvas in a first area included within a first stroke. Such arrangement is characterized in that (1) the content conveys a plural-bit digital payload encoded by said signal-carrying pattern; and (2) the signal-carrying pattern was earlier derived, using a neural network, from an image depicting a natural or synthetic pattern.

Another method is similar, but is characterized in that (1) the graphical content conveys a plural-bit digital payload encoded by said signal-carrying pattern; (2) the first signal-carrying pattern is rendered with a first mean value or contrast, due a pressure with which the user applies the physical stylus to a substrate when making the first stroke; and (3) the second signal-carrying pattern is rendered with a second mean value or contrast due to a pressure with which the user applies the physical stylus to the substrate when making the second stroke, where the second value is different than the first.

Another method is also similar, but involves—responsive to input from the user's virtual tool—rendering a first signal-carrying pattern on the canvas in a first area included within a first stroke, and rendering a second signal-carrying pattern on the canvas in a second area included within a second stroke, where the rendered first and second patterns both correspond to a common reference pattern stored in the memory. Such arrangement is characterized in that (1) the graphical content conveys a plural-bit digital payload encoded by patterns defined by the plural strokes; and (2) elements of the first pattern, rendered within the first area, have a variance or mean amplitude that differs from a variance or mean amplitude, respectively, of spatially-corresponding elements of the reference pattern.

Figure 10:
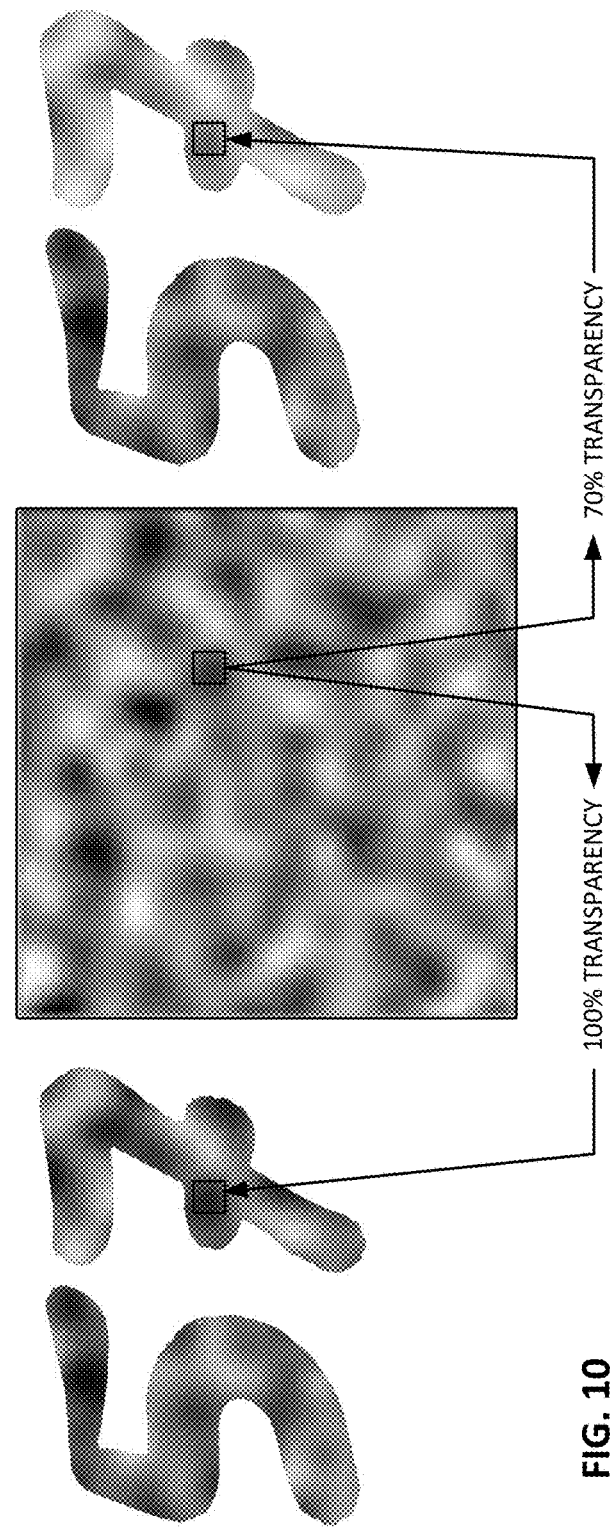
FIG. 10 shows correspondence between a signal-carrying pattern, and handwritten strokes of different pressures—causing the pattern to be rendered with different mean values.

An example of this latter arrangement is illustrated by FIG. 10. Elements of the "7" on the right side of the figure (e.g., within the small box), have a mean amplitude that is different than that of spatially-corresponding elements of the reference pattern (e.g., within the corresponding small box in the center of the figure).

Graphical content produced by the described arrangements can be printed and scanned, or imaged by a camera-equipped device (like a smartphone) from on-screen or a print rendering, to produce an image from which the payload can be extracted, using techniques detailed in the cited art. (The image format is irrelevant—data can be extracted from TIF, JPG, PDF, etc., data.) This enables a great number of applications, including authoring artwork for product packaging that encodes a UPC code or that links to product information, communicating copyright, indicating irrefutable authorship, and authenticating content (e.g., by use of digital signature conveyed by the pattern). It also helps bridge the analog/digital divide, by enabling handwritten notes—on tablets and electronic whiteboards—to be electronically stored and searched, using metadata that is inseparably bound with the notes.

A variant arrangement is shown in FIGS. 11A-C and 12. In this arrangement, a signal pattern again underlies the user-added information. However, in this case, the signal pattern is a random pattern, such as a frame of noise. And instead of the output comprising the user's graphical strokes conveying a hidden plural-bit payload, the output of this second arrangement comprises a frame of noise that conveys the user's graphical strokes in hidden fashion.

Elements of the random noise frame can be binarily-valued (e.g., 0 or 1, or −1 or 1), or may each comprise a plural bit datum. In one particular arrangement, each element is two bits (e.g., 00, 01, 10 or 10). The elements are generated by any random- or pseudo-random number generation process. (Random is used herein to encompass both random and pseudo-random.) Various such processes are known; some are implemented in popular software tools, such as from Microsoft and Google, and from the online service random<dot>org. Random numbers can also be generated by occasionally sampling (and optionally permuting) a physical parameter, such as temperature, pressure, intensity, etc. The Wikipedia article, Hardware Random Number Generator (attached to application 62/784,198), identifies many such alternatives.

As before, the user "draws" with a stylus or other tool. Instead of simply revealing or rendering a pattern that is spatially-associated with locations of the user's strokes, as described above, a deterministic process—such as bit inversion, is applied to the underlying data elements of the noise frame.

Figures 11A, 11B, 11C, 12:
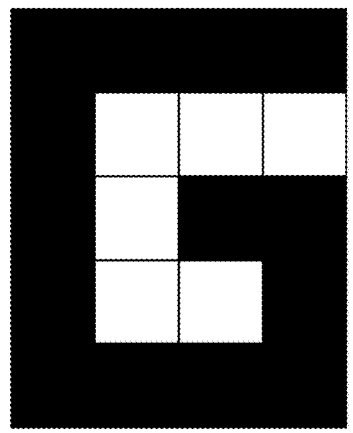
FIGS. 11A-C illustrate another embodiment employing aspects of the present technology.
FIG. 12 shows a PDF-style document that can be used in certain embodiments employing the present technology.

FIGS. 11A-11C give an example. FIG. 11A shows a small excerpt of a noise frame. FIG. 11B shows a shape written by the user on the tablet. Each sensing cell of the touchscreen corresponds to a cell of the underlying random data. For each cell encompassed by the user's stylus stroke(s), the corresponding cell in the noise frame is bitwise-inverted, as shown in FIG. 11C.

Naturally, encoding operators more complex than simple bit-inversion can be employed. One example is a multiplier operation. Another is addition.

The FIG. 11C pattern can be stored, or transmitted to a recipient. The user's strokes are revealed (decoded) by comparing the FIG. 11C pattern with the original noise pattern. The differences reveal the strokes of the user's writing.

This arrangement also provides an important authenticity check. The cells that are different must differ from the original noise frame in a particular way. That is, they must differ in accordance with the encoding operation used. If bitwise inversion is used, then any cell in the received frame of information must have one of two values: the cell's original value (as found in the original noise frame), or its bitwise inverse. If any other value is found, this indicates that the received frame of information has been changed in some way. Its authenticity is then suspect.

In the just-referenced arrangement, it is assumed that there are two parties—a sender and a receiver. Both must have access to the same frame of random data; the sender uses it for encoding the handwritten strokes; the receiver uses it for extracting the handwritten strokes from the encoded noise frame. A variety of techniques for providing identical random data at two spaced-apart parties are known. One is the old technique of one-time pads. (The Wikipedia article for "One-Time Pad" is attached to application 62/784, 198.) Another employs a central secure vault from which an authenticated pair of parties can download pairs of noise data frames for one-time use.

Instead of encoding a user's stylus strokes into the frame of noise data, typewritten alphanumeric text—as may be generated by a word processing program—can be encoded. That is, the graphical letter "G" in FIG. 11B may be generated as a bit-mapped glyph by a word processor, instead of by a user's stylus. The encoding can proceed as detailed above.

In some instances, typewritten alphanumeric text is not bitonal (i.e., comprised exclusively of white and black cells), but is grey-scaled, e.g., with each pixel having one of 16 values (i.e., 4-bit greyscale). In such case, the frame of noise data can be generated with 4-bit elements, instead of 2-bits as shown in FIG. 11A.

In such an embodiment, the binary value of each cell in the greyscale representation of the text can be added to the binary value of the spatially-corresponding cell of the noise frame, in modulo style. Thus, if a greyscale value of 1111 is added to a noise frame value of 0001, then the result is 0000. (Similarly, if a greyscale value of 1111 is added to a noise frame value of 1111, then the result is 1110. Etc.) Again a receiver of the encoded noise frame performs a reciprocal operation to retrieve the originally-encoded greyscale information—subtracting the original noise value of a cell from its value in the encoded frame, to reveal the greyscale information originally-encoded.

Greyscale image information can be conveyed in similar fashion, e.g., JPEG, TIF, RAW files, etc. Color images can be handled likewise, by appropriate extension (e.g., with 3 noise values for each element of the random frame, in the case of Red/Green/Blue color images).

In one particular embodiment, the encoded noise frame is included as a data structure within a container object, such as a Portable Document Format (PDF) object. In some embodiments there are multiple data structures. One, termed a Classic Sheet in FIG. 12, is conventional per the PDF standard. A second, termed a Secure Sheet in FIG. 12, comprises the noise frame after processing with the user data (which may be regarded as a form of encoding).

The Classic Sheet can convey metadata, such as the time and date of file creation, and a CRC or other data integrity check for other information conveyed by the PDF container (including the Secure Sheet). Such information is typically provided in cleartext form—unencrypted (although in some embodiments, encryption can be used). Additional bibliographic information, such as the name of the author, the author's address, identifying number (e.g., social security number), and other personal information, may be included in the Classic Sheet. Alternatively, such information may be rendered as alphanumeric text and encoded in a noise frame, as detailed above, and conveyed by the Secure Sheet.

In a particular embodiment, the Classic Sheet includes a cleartext digital signature created by applying the sender's private cryptographic key, of a public/private key pair, to a hash performed on the contents of the Classic and Secure sheets. A recipient can then re-compute such a hash on the Classic and Secure sheets, as received, and check authenticity by applying the sender's public key.

In some embodiments the original noise signal is tiled. For example, a reference noise signal, having dimensions of 512×512 elements (pixels) is generated, and is then tiled edge-to-edge across the frame. Alternatively, the original noise signal may be un-tiled, with no spatial correlation across its extent.

In some embodiments the original noise signal is combined with a watermark reference signal, as described in the documents incorporated herein, to resolve any ambiguity about geometrical synchronization. In other embodiments, no reference signal is employed, because the PDF document conveys the information with no data loss. (In such case there is no ambiguity as to synchronization, e.g., the upper left corner of the frame can be reliably used as a common reference point by which encoding and decoding can proceed.)

In a preferred embodiment, the recipient has PDF reader software that operates to present information from the Classic Sheet in a conventional manner, e.g., as metadata visible from a Properties opinion in a Menu tab of a graphical user interface, or simply presented as a text document on-screen when the file is opened. The software further has instructions operable to decode the alphanumeric (or image) data encoded in the noise frame. Such decoded pattern can be presented on-screen as an image file. Desirably, any textual elements are OCR-processed, e.g., automatically, so the recipient can copy/paste such text from the decoded Secure Sheet into other programs or documents, as needed. After OCRing, the screen can display the OCR'd ASCII text, or can simply display the image file.

CONCLUDING REMARKS

Having described and illustrated our technology with reference to exemplary embodiments, it should be recognized that our technology is not so limited.

For example, while the specification detailed arrangements to encode handwritten input on computer devices, it will be recognized that the same techniques can be used with computer-rendered graphics. Rendered text, for instance, can serve as a transparency mask that reveals a data-carrying pattern in another layer. Or such text can be rendered with a data-carrying pattern.

Similarly, while the specification detailed arrangements to secure rendered text in a PDF file, it will be appreciated that the same approach can likewise be used to secure graphical data, such as handwritten input and artwork.

In some embodiments, the patterns produced by the present technology can be displayed on, and read from, digital displays—such as smartphones, digital watches, electronic signboards, tablets, etc.

It should be understood that digital watermarks commonly include two components: a reference or synchronization signal (enabling geometric registration), and a payload signal (conveying plural symbols of information).

Various examples of watermark encoding and decoding protocols, and associated processing, are detailed in Applicant's prior work, such as our U.S. Pat. Nos. 6,614,914, 5,862,260, 6,674,876, 9,959,587 and 10,242,434, and US patent publications 20100150434 and 20190332840—all of which are incorporated herein by reference. More information on signaling protocols, and schemes for managing compatibility among protocols, is provided in U.S. Pat. No. 7,412,072, which is hereby incorporated by reference.

Related technologies for securing and/or authenticating information in documents, such as PDFs, is detailed in US patent documents 20030083906, 20040059929, 20060294002, 20080005667, 20080028333, 20090190159, 20090259729, 20100106973, 20140032899, 20140032913, 20160119582, 20160267292, 20170352039, 6,205,549, 7,761,922, 7,840,802 and 7,930,738. Features and arrangements from embodiments detailed in these documents can be included in implementations of the present technology.

The technology detailed herein can be implemented using a variety of different hardware structures, such as a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of one of the above-detailed algorithms on a microprocessor—such as the decoding of an encoded noise frame—can begin by first defining the sequence of operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed arrangements, due to the nature of the data being processed, and the opportunities for parallelism.

While microprocessors can be reprogrammed, by suitable software, to perform a variety of different algorithms, ASICs cannot. While a particular Intel microprocessor might be programmed today to decode an encoded noise frame, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified function). The custom design makes more efficient use of the available substrate space—allowing shorter signal paths and higher speed performance. Full-custom ASICs can also be fabricated to include analog components, and other circuits.

Generally speaking, ASIC-based implementations of the detailed arrangements offer higher performance, and consume less power, than implementations employing microprocessors. A drawback, however, is the significant time and expense required to design and fabricate circuitry that is tailor-made for one particular application.

An ASIC-based implementation of one of the above arrangements again can begin by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to implement the above-detailed arrangements is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of the above-detailed arrangements begins by specifying a set of operations in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to implement the detailed arrangements. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, the weights of convolution kernels can be defined by parameters stored in a re-writable memory. By such arrangement, the same ASIC may be incorporated into two disparate devices, which employ different convolution kernels. One may be a device that employs a neural network to recognize grocery items. Another may be a device that morphs a watermark pattern so as to take on attributes of a desired geometrical pattern, as detailed above. The chips are all identically produced in a single semiconductor fab, but are differentiated in their end-use by different kernel data stored in memory (which may be on-chip or off).

Yet another hybrid approach employs application-specific instruction set processors (ASIPS). ASIPS can be thought of as microprocessors. However, instead of having multipurpose native instruction sets, the instruction set is tailored—in the design stage, prior to fabrication—to a particular intended use. Thus, an ASIP may be designed to include native instructions that serve operations involved, e.g., in decoding an encoded noise frame, etc. However, such native instruction set would lack certain of the instructions available in more general purpose microprocessors.

Reconfigurable hardware and ASIP arrangements are further detailed in U.S. Pat. No. 9,819,950, the disclosure of which is incorporated herein by reference.

Processing hardware suitable for neural networks are also widely available in "the cloud," such as the Azure service by Microsoft Corp, and CloudAI by Google.

Familiar image processing libraries such as OpenCV can be employed to perform many of the methods detailed in this specification. Software instructions for implementing the detailed functionality can also be authored by the artisan in C, C++, MatLab, Visual Basic, Java, Python, Tcl, Perl, Scheme, Ruby, etc., based on the descriptions provided herein.

Software and hardware configuration data/instructions are commonly stored as instructions in one or more data structures conveyed by tangible media, such as magnetic or optical discs, memory cards, ROM, etc., which may be accessed across a network.

This specification has discussed various arrangements. It should be understood that the methods, elements and features detailed in connection with one arrangement can be combined with the methods, elements and features detailed in connection with other arrangements.

Moreover, it will be recognized that the detailed technology can be included with other technologies—current and upcoming—to advantageous effect. Implementation of such combinations should be straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

The invention claimed is:

1. A non-transitory computer readable medium containing software instructions operable to configure a processor-equipped hardware system to perform actions including:
  decoding a frame of encoded image data received from a first party, using a frame of noise data comprising reference pixels, the decoded frame comprising alphanumeric glyphs, said decoding determining, for each of plural pixels in said frame of encoded image data, whether a value of said pixel is a reference pixel value, or a transformed pixel value, wherein spatial arrangement of said transformed pixel values define shapes of said alphanumeric glyphs;
  performing an optical character recognition operation on the alphanumeric glyphs; and
  displaying text corresponding to said alphanumeric glyphs on a screen of the hardware system
  wherein said decoding includes, for each of plural pixel locations within said frame of encoded image data, comparing the encoded image data to noise data at a corresponding location in said frame of noise data, and assigning a value to an output element in said decoded frame based on a result of said comparing.

2. The medium of claim 1 wherein said comparing indicates encoded image data at a first location within said frame of encoded image data is equal to noise data at a corresponding first location in said frame of noise data, and as a consequence of said equality, assigning a first value to said output element in the decoded frame.

3. The medium of claim 2 wherein said comparing indicates encoded image data at a second location within said frame of encoded image data is a bit-wise inverse of noise data at a corresponding second location in said frame of noise data, and as a consequence of said bit-wise inversion, assigning a second value different than said first value to said output element in the decoded frame.

4. The medium of claim 1 in which a block of noise data is repetitively tiled to comprise said frame of noise data.

5. The medium of claim 1 in which said frame of encoded image data is received in a portable document format (PDF) document, said document further including additional data, said additional data including a digital signature computed on a hash of the encoded image data.

6. The medium of claim 1 in which said software instructions are further operable to configure the processor-equipped hardware system to determine authenticity of the frame of encoded image data by checking that each element thereof is equal to a corresponding element in the frame of noise data, or is a bit-wise inverse of the corresponding element in the frame of noise data.

7. The medium of claim 1 in which the frame of noise data comprises plural noise values, each noise value comprising a plural-bit datum.

8. A method comprising the acts:
  decoding a frame of encoded image data, using a frame of noise data comprising reference pixels, the decoded frame comprising alphanumeric glyphs, said decoding determining, for each of plural pixels in said frame of encoded image data, whether a value of said pixel is a reference pixel value, or a transformed pixel value, wherein spatial arrangement of said transformed pixel values define shapes of said alphanumeric glyphs;
  performing an optical character recognition operation on the alphanumeric glyphs; and
  displaying text corresponding to said alphanumeric glyphs on a display screen;
  wherein said decoding includes, for each of plural pixel locations within said frame of encoded image data, comparing the encoded image data to noise data at a corresponding location in said frame of noise data, and assigning a value to an output element in said decoded frame based on a result of said comparing.

9. The method of claim 8 wherein said comparing indicates encoded image data at a first location within said frame of encoded image data is equal to noise data at a corresponding first location in said frame of noise data, and as a consequence of said equality, assigning a first value to said output element in the decoded frame.

10. The method of claim 9 wherein said comparing indicates encoded image data at a second location within said frame of encoded image data is a bit-wise inverse of noise data at a corresponding second location in said frame of noise data, and as a consequence of said bit-wise inversion, assigning a second value different than said first value to said output element in the decoded frame.

11. The method of claim 8 in which a block of noise data is repetitively tiled to comprise said frame of noise data.

12. The method of claim 8 in which said frame of encoded image data is received in a portable document format (PDF) document, said document further including additional data, said additional data including a digital signature computed on a hash of the encoded image data.

13. The method of claim 8 that further includes determining authenticity of the frame of encoded image data by checking that each element thereof is equal to a corresponding element in the frame of noise data, or is a bit-wise inverse of the corresponding element in the frame of noise data.

14. The method of claim 8 in which the frame of noise data comprises plural noise values, each noise value comprising a plural-bit datum.

15. An apparatus comprising:
  means for performing a decoding operation on a frame of encoded image data to produce a decoded frame comprising alphanumeric glyphs, said decoding operation determining, for each of plural pixels in said frame of encoded image data, whether a value of said pixel is a reference pixel value, or a transformed pixel value, wherein spatial arrangement of said transformed pixel values define shapes of said alphanumeric glyphs;

a processor configured to perform an optical character recognition on the alphanumeric glyphs, yielding corresponding text; and a display screen for displaying said text;

wherein said decoding operation includes, for each of plural pixel locations within said frame of encoded image data, comparing the encoded image data to noise data at a corresponding location in said frame of noise data, and assigning a value to an output element in said decoded frame based on a result of said comparing.

* * * * *